June 23, 1964 W. P. HANF 3,138,787

DOUBLE TRIANGULAR ARRAY MEMORY DRIVE

Filed Aug. 25, 1961 2 Sheets-Sheet 1

INVENTOR
WILLIAM P. HANF

BY Leo J. Aubel
ATTORNEY

June 23, 1964 W. P. HANF 3,138,787

DOUBLE TRIANGULAR ARRAY MEMORY DRIVE

Filed Aug. 25, 1961

2 Sheets-Sheet 2

United States Patent Office 3,138,787

Patented June 23, 1964

3,138,787

DOUBLE TRIANGULAR ARRAY MEMORY DRIVE

William P. Hanf, Berkeley, Calif., assignor to International Business Machines Corporation, New York, N.Y., a corporation of New York Filed Aug. 25, 1961, Ser. No. 133,864
2 Claims. (Cl. 340—174)

Figure 1A:
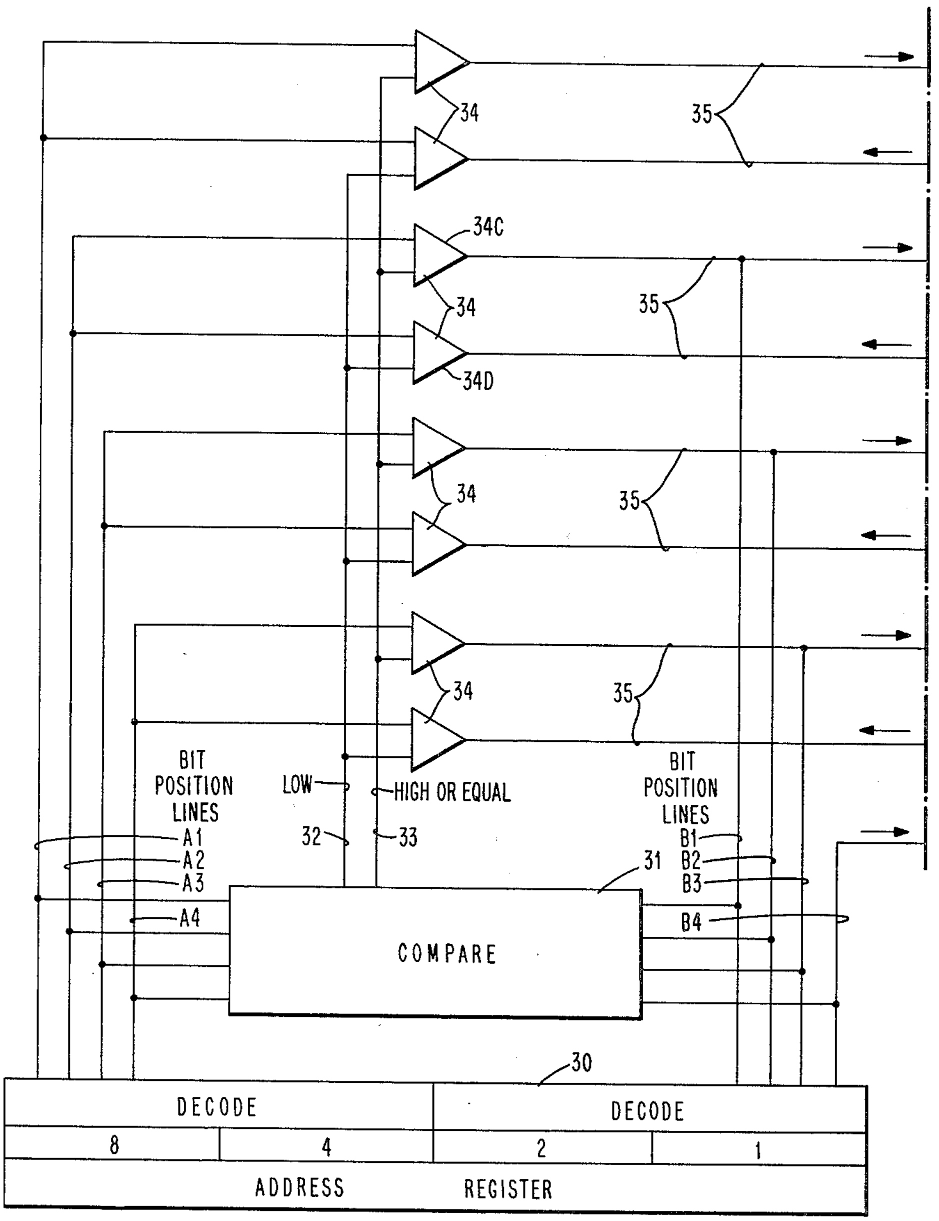

This invention relates to arrays or matrices and more particularly to an array or matrix arranged as a plurality of submatrix patterns, and which may be operated by a minimum of drivers.

In arrays or matrices comprising magnetic cores or other bistable devices or elements, a device is selected by applying a less than full-select current in each of the drive lines driving a device. For example, prior art core arrays arrange the cores in rectangular or square configurations of rows and columns, and distinct drivers drive each of the rows and columns; coincidence of the driving currents at a core position causes the core to be selected, i.e., to shift its magnetic state. Such prior art arrays require a relatively large number of drivers for driving each array. For example, to drive a 10,000 core array, 100 drivers are required to drive the rows of cores and 100 drivers are required to drive the columns, thus making a total of 200 drivers.

Accordingly, it is a principal object of the present invention to provide an array or matrix utilizing a minimum of drivers.

It is another object of the present invention to provide an improved matrix configuration.

It is yet another object of the present invention to provide an improved core matrix in which the cores are arranged in a double triangular configuration.

In a preferred embodiment of the invention, I provide a core matrix arranged as two triangular submatrices in base-to-base relation. A drive line from each driver is arranged to energize a row of cores and a corresponding column of cores; the winding is wound in one sense through the cores in the respective row to drive the cores toward one stable state and in the opposite sense through the cores in the respective column to drive the cores toward the opposite stable state. The windings are arranged such that lines from two drivers are wound or pass through corresponding cores in each of the triangular submatrices. A core is thus selected by activating two drivers. By reversing the current through one of the windings, the other core is selected.

The foregoing and other objects, features and advantages of the invention will be apparent from the following more particular description of a preferred embodiment of the invention, as illustrated in the accompanying drawings.

Figure 1B:
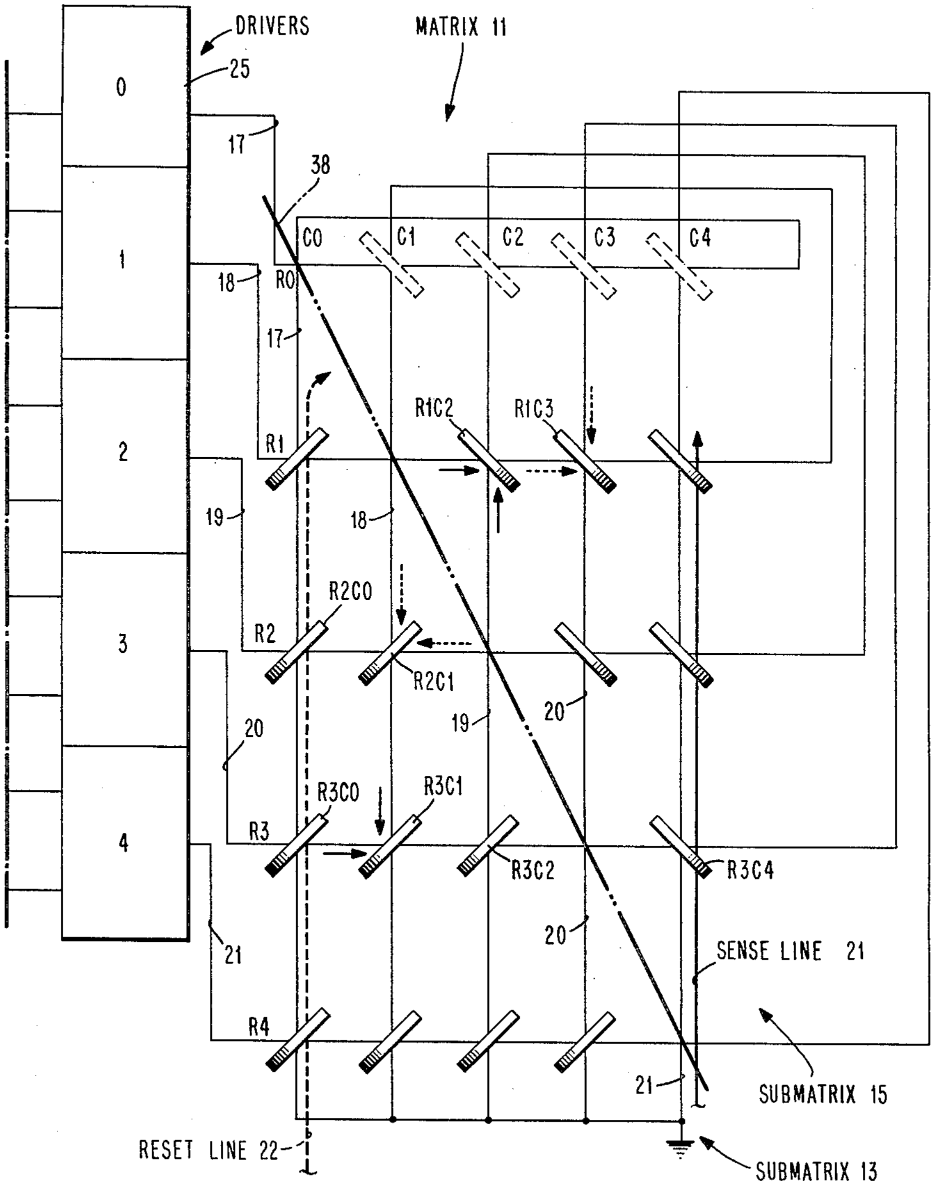

In the drawings:

FIGS. 1*a* and 1*b* show a matrix in accordance with the invention including a block diagram of a circuit for controlling the drivers which drive the matrix.

The arrangement of core matrix 11 of the invention is shown in FIG. 1*b*. Matrix 11 is formed of bistable magnetic cores of any suitable known type, indicated in FIG. 1*b* by the elongated small rectangles, for example, note the core labeled R2C1. As is known, the cores require a current of a particular magnitude and polarity (conventionally termed a full-select current) to shift from one to the other of their stable states. The sense or direction in which a line is wound on the cores is indicated by the orientation of the core. For example, the respective windings are wound or pass through cores R3C2 and R3C4 in relatively opposite directions, as will be described more fully hereinbelow.

The cores of matrix 11 are arranged as two triangular submatrix configurations 13 and 15, the dividing section line 38 is shown for emphasis. The bases of the triangles 13 and 15 are arranged to be facing each other. The triangular submatrices 13 and 15 are, in turn, positioned to form the rows R0–R4 and the columns C0–C4 of matrix 11 having a rectangular or square configuration.

For purposes of ease of explanation, the figures show a matrix having only a relatively small number of cores. Specifically, the figure illustrates an arrangement for driving $N^2+N$ elements using $N+1$ drivers, taking the special case of $N=4$. For purposes of explanation, a core is designated by reference to the row and column intersection at which it is positioned.

The windings or lines 17–21 which are wound through the respective rows and columns of cores are connected to be energized by respective drivers numbered 0–4, and collectively designated as 25. Each of the drive lines 171–21 passes through a respective row of cores and then doubles back on itself and passes through a respective column of cores. For example, line 17 passes through row R0 of the cores and then doubles back on itself and passes through the column C0 of the cores. As noted, each of the lines passes through the cores in a given row of submatrix 13 in one direction to tend to shift the cores to one stable state and through the cores in the same row of submatrix 15 in the opposite direction to tend to shift the cores to the opposite stable state and, conversely, each of the lines passes through the cores in a given column of the two submatrices in opposite directions. For example, current flow in one direction through line 20 would tend to drive cores R3C0, R3C1 and R3C2 in submatrix 13 toward one stable state and the same current through line 20 would tend to drive cores R3C4 in submatrix 15 toward the opposite stable state.

Each one of the drivers provides a current of one-half select amplitude to its respective line 17–21. The drivers, individually designated as 0–4, are bilateral drivers of any suitable known type which drive a current in either direction through their respective lines. Note, that in this particular addressing circuit, the driver 0 need only drive current in one direction.

One suitable circuit for addressing a double triangular array from a four bit binary address is shown in the block diagrams of FIG. 1*a*. Note that other addressing schemes could be equally as effective in driving the matrix 11. The address register and decode 30, compare circuit 31 and the AND circuits 34 are of any suitable known type and are therefore shown only as block diagrams; these units do not per se form a part of the invention.

For purposes of making the description generally applicable, the output of the address register and decode 30 is shown as being based on a binary radix and having four distinct bit positions, that is, $2^0=1$ or a 1 bit position, $2^1=2$ or a 2 bit position, $2^2=4$ or a 4 bit position, and $2^4=8$ or an 8 bit position. This would correspond to the units, tens, hundreds and thousands positions in a code based on the radix 10. The 1 and 2 bit positions are connected through bit position lines indicated collectively as B, to a compare circuit 31 and in parallel to drivers 1–4. Likewise, the 4 and 8 bits are connected through bit position lines, indicated collectively as A, to compare circuit 31 and in parallel to AND circuits generally indicated as 34. During an operation cycle, one of the A bit position lines, that is A1, A2, A3 or A4 is energized by the address register and decode 30 to indicate the combination of a numerical value of the 4 and 8 bit positions. Likewise, during the same operation cycle, one of the B bit position lines, B1, B2, B3 or B4 is energized by the address register and decode 30 to indicate the numerical value of the 1 and 2 bit positions. The A and B bit position lines, when energized, have the following relation: $A1=B1$; $A2=B2$; $A3=B3$; $A4=B4$; and $A4>A3>A2>A1$. The Low output line 32 from compare circuit 31 indicates that the energized line in the bit position lines B is numerically lower than the energized line in the bit position lines A. Likewise, the High output line 33 indicates that the energized line in the bit position lines B is numerically higher than the energized line in the bit position lines A. The AND circuits 34 are coupled through lines indicated collectviely as 35 to respective ones of the drivers 25.

The relative direction in which current is caused to flow by the drivers 25 in response to control by the associated AND circuits 34 is indicated by the arrows on lines 35. When the 1 and 2 bits are low in comparison to the 4 and 8 bits (B lower than A), one of the drivers 1–4 drives current in a negative direction (to the left, as oriented in the drawings) for shifting the associated cores of submatrix 15, as will be explained. In the high or equal condition (B higher or equal to A), one of the drivers 0–3 drives current in a positive direction (to the right, as oriented in the drawings) for shifting the associated cores in submatrix 13, as will be explained. The terms "negative" and "positive" merely indicate relative direction of current flow.

As an example, when bit position line A2 and bit position line B1 are energized (B lower than A), the combination of the output from the compare circuit 31 through line 32 and the output from bit position line A2 enables AND circuit 34D. AND circuit 34D, in turn, activates driver 2 to cause current of a one-half select amplitude to flow through line 19 upward from ground reference and toward the left (as oriented in the drawing). Concurrently, bit position line B1 activates driver 1 to cause current of a one-half select amplitude to flow in line 18 toward the right and downward (as oriented in the figure). The combined effect of the currents flowing through lines 18 and 19 will provide a full select current to switch core R1C2 to shift stable states (note the arrows adjacent R1C2). At the same time the current flowing through line 18 (downward through column C1) and the current flowing through line 19 toward the left will combine at the position of core R2C1; however, the two currents flow through core R2C1 in relatively opposite senses or directions (note the direction of the dotted arrows at R2C1) to thereby cancel, and consequently do not affect the state of core R2C1.

Conversely, if bit position line A2 and bit position line B3 are energized (B higher than A), the combination of the output from the compare circuit 31 through line 33 and the output from bit position line A2 enables AND circuit 34C. AND circuit 34C, in turn, activates driver 1 to cause current to flow in line 18 toward the right and downward through column C1, as oriented in the figure. Concurrently, bit position line B3 activates driver 3 to cause current flow in line 20 toward the right and downward through column C2. The combined effect of the current flowing in lines 18 and 20 provides a full select current to switch core R3C1. At this same time, the currents flowing through lines 18 and 20 will combine at core position R1C3; however, the two currents flow through core R1C3 in relatively opposite directions (note the dotted arrows) and thereby cancel.

The other cores in the submatrices are selected in a similar manner by activating the appropriate two drivers to drive current through the associated lines in the desired direction.

In the embodiment shown, because of the particular driving circuit employed, the top row R0 of cores of matrix 11 is not utilized; however, with other driving schemes a top row of cores can be operated in the same manner of selection, as indicated for the other cores of the matrix.

To read out the selected core, either the polarity of the drive pulses can be reversed, or a common Reset line 22 can be pulsed to reset all the cores. A sense line 21 for sensing the output signals, as is well known in the art, is wound through the cores in the matrix 11.

The matrix of FIG. 1*b* permits driving $N^2$ or $N^2+N$ elements of an array with $N+1$ drivers. Although $N^2+N$ elements of an array can actually be driven, ordinarily in order to easily decode from a binary or decimal number system, N is taken to be a power of 2 or 10 and the number of elements driven will also be a power of 2 or 10. The foregoing is only possible if the number of elements is taken to be $N^2$ rather than $N^2+N$. Thus, for example, with decimal addressing, 101 drivers are actually capable of driving 10,100 elements but ordinarily it would only be desired to drive 10,000 elements.

The principle employed in driving the two dimensional arrays, shown in FIGS. 1*a* and 1*b*, may be extended to a three or higher dimensional memory array. For purposes of this discussion, assume that a K dimensional memory array is one in which an element of an array is selected by the presence of K currents adding up to affect an element, but the element is not selected by any K–1 currents. In the case of a K dimensional memory, the number of elements that can be selected using N unidirectional drivers is the number of ways that K different drivers can be selected out of N different drivers; that is, the formula is given by $$\frac{N!}{K!(N-K)!}$$

This corresponds to a triangular array. If N bilateral drivers are used, each driver can be on in the forward or backward direction and since K drivers are on at one time, the number of combinations is $2^K$. Thus, the number of elements that can be driven by the N bilateral drivers is $$(2^{K-1})\left(\frac{N!}{K!(N-K)!}\right)$$

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A matrix comprising a plurality of cores arranged in rows and columns and each capable of being set to a first or second stable state by a current through a winding on each said core, windings for each core in each row of cores wound so that current in a first direction will drive some cores toward a first stable state and the remainder of said cores toward a second stable state while current in a second direction will provide an opposite drive, windings for each core in each column of cores wound so that current in a first direction will drive some cores toward a first stable state and the remainder of said cores toward a second stable state and current in a second direction will provide an opposite drive, means for connecting the winding for each row to a winding for a corresponding column, drivers connected to said row windings to provide current in a first or second direction, and means for controlling a selected driver to provide current in a first direction in a row in which a core is to be selected and controlling another driver to provide current in a second direction through another row connected to the column in which said core is located, wherein a core in a selected location may be set to a desired stable condition.

2. A matrix comprising a plurality of cores arranged in rows and columns and each capable of being set to a first or second stable state by a current through a winding on each said core, windings for each core in each row of cores wound so that current in a first direction will drive a number of cores proportional to the row position being considered, where said row position is determined by proximity to one side of said matrix, to a first stable state and the remainder of said cores toward a second stable state while current in a second direction will provide an opposite drive, windings for each core in each column of cores wound so that current in a first direction will drive a number of cores proportional to the column position being considered, where said column position is determined by proximity to one side of said matrix, to a first stable state and the remainder of said cores toward a second stable state while current in a second direction will provide an opposite drive, means for connecting the winding for each row to a winding of a column where the particular row and corresponding column connection are the column and row which are similarly situated from the intersecting sides of the matrix, drivers connected to said row windings to provide current in a first or second direction, and means for controlling a selected driver to provide current in a first direction in a row in which a core is to be selected and controlling another driver to provide current in a second direction through another row connected to the column in which said core is located, wherein a core in a selected location may be set to a desired stable condition.

References Cited in the file of this patent

UNITED STATES PATENTS 2,802,203 Stuart-Williams -------- Aug. 6, 1957

OTHER REFERENCES

Publication I, IBM Technical Disclosure Bulletin, vol. 3, No. 5, page 48, October 1960, #180.